Sept. 1, 1942.  L. W. STETTNER  2,294,487

PRESSURE REGULATOR CONTROL VALVE

Original Filed April 28, 1939

INVENTOR.
LUDWIG W. STETTNER
BY
ATTORNEY.

Patented Sept. 1, 1942

2,294,487

UNITED STATES PATENT OFFICE 2,294,487

PRESSURE REGULATOR CONTROL VALVE

Ludwig W. Stettner, Piedmont, Calif., assignor to Victor Equipment Company, San Francisco, Calif., a corporation of Delaware Original application April 28, 1939, Serial No. 270,561, now Patent No. 2,248,592, dated July 8, 1941. Divided and this application June 30, 1941, Serial No. 400,459

2 Claims. (Cl. 137—156)

This invention relates to automatic gas pressure regulators of the type used for reducing the pressures of gases used in welding and cutting to maintain a working pressure, and the invention has for its principal object an improved construction of the controlling or loading valve arrangement in the specific type of such regulators in which gas under pressure is used instead of a spring to balance the desired working pressure. This application is a division of my copending application filed April 28, 1939, Serial No. 270,561, now Patent No. 2,248,592, granted July 8, 1941.

Features and advantages of the improvement will appear in the following description and accompanying drawing.

As the invention relates to the construction of the controlling valve arrangement carried by the bonnet of the regulator, the description will be confined as much as possible to its particular features and associated gas channels.

Figure 1:
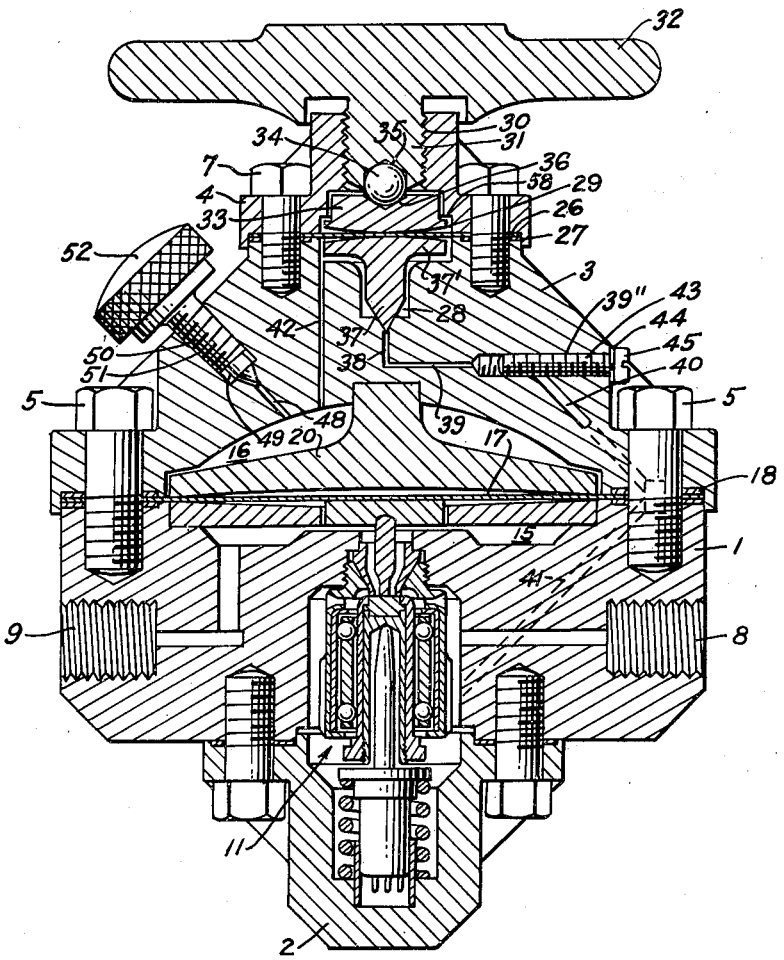
Fig. 1 is a longitudinal central sectional view taken through a gas pressure regulator equipped with my improved controlling valve.

In Fig. 1 the body of the regulator is designated 1, the lower cap 2 which covers the valve mechanism, the bonnet 3 covering the main diaphragm assemblage, and the cap 4 above the bonnet housing my controlling or loading valve assemblage.

The bonnet 3 is secured to the body by cap screws 5, and the cap 4 is similarly secured to the bonnet by screws 7.

Extending into the body is a high pressure gas inlet 8 and a low or controlled pressure outlet 9 and within the body is the regulator valve mechanism generally designated 11 positioned in a high pressure chamber 10, and above which is a low pressure chamber 15 walled off by the main diaphragm 17 backed by a supporting disk 20 and providing a gas pressure space 16 above the diaphragm assemblage, all as fully described in my copending application above mentioned.

Between cap 4 and the bonnet is a flexible diaphragm 26 suitably sealed by one or more gasket rings 27 and clamped tightly in place by bonnet screws 7. This diaphragm covers a chamber 28 recessed into the bonnet, and separates it from a similar chamber 29 recessed into the cap 4, and the latter recess is extended as a bore through the upper end of the cap and internally threaded as at 30 to receive the threaded shank or hub 31 of a handwheel 32. Below the lower end of the shank 31 is a thick disk 33 slightly rounded on its under face and supported on the upper side of diaphragm 26, while between disk 33 and handwheel shank 31 is a pressure distributing ball 34 revolvably retained in a relatively deep recessed seat 35 in the shank and bearing in a shallower seat 36 formed in the disk.

Below the diaphragm in chamber 28 is a needle valve member 37 formed with a disk-like upper end 37' rounded slightly on its outer face and bearing against the under side of diaphragm 26.

This needle valve is arranged to close the upper end of a small drilled hole 38 which extends at several stages 39, 40, 41 to the margin of the bonnet, through the gaskets 18 and margin of diaphragm 17 leading from the high pressure space 10, while another drill hole 42 connects chamber 28 with chamber 16. Hole 39 is enlarged at 39" and extended past hole 40 to open at the outside of the bonnet and is internally threaded and fitted with a screw 43 with a soft metal gasket 44 under its head 45 so that it will seal gas tight at this point when screwed up tight. This screw passes the point where hole 40 connects with hole 39", so that gas under high pressure from chamber 10 by way of passages 40 and 41 in attempting to pass into passage 39" will be throttled down to the very slight clearance normally existing between the threads of screw 43 and the threads of the hole 39", so that in event handwheel 32 were unscrewed quickly in admitting more pressure to chamber 16 there would not be a sudden excess rush of high pressure gas to the chamber.

Means for bleeding off the pressure from chamber 16 as may be desired, is provided by a small passage 48 extending from the chamber and normally closed at its end by a needle valve 49 at the end of a screw 50 threaded into a hole 51 leading to atmosphere. A large milled thumb nut 52 provides for easy manual operation of this needle valve, and when the valve is released the gas pressure escapes by the slight thread clearance along the screw as previously explained for screw 43.

In operation, by turning handwheel 1 to admit gas under pressure to chamber 16 it will find its way through the ordinary inequalities of commercial workmanship to the under side of plate 20 to influence the main diaphragm 17 in controlling the action of the regulating valve mechanism 11, as well understood in the use of such regulators.

By properly manipulating handwheel 32 and relief screw 52 any desired gas pressure may be set up in chamber 16 and sealed in the bonnet by closing both valves 49 and 37 to thus maintain any desired working pressure in low pressure chamber 15.

Figure 2:
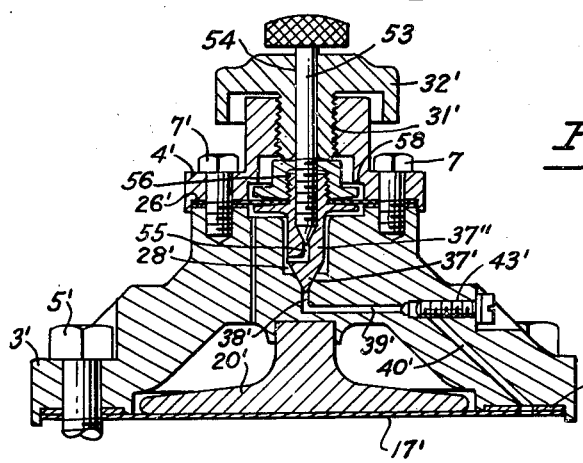
Fig. 2 is a similar sectional view to that of Fig. 1, but showing the bonnet only of the regulator and a modified form of the controlling valve.

In the modification shown in Fig. 2, the bonnet and main diaphragm assembly are shown detached from the body of the regulator, and the similar parts already described for Fig. 1 are given the same numerals additionally primed, and therefore need no further explanation.

The modified features are that the gas relief screw valve 49—52 of Fig. 1 is not used, but in place of it a long relief screw valve 53 is extended through an axial hole 54 in the handwheel 32' and shank 31' and threaded into an axial hole in needle valve member 37" to close off a small hole 55 opening through the side of the needle valve to chamber 28'.

In order to prevent the rotation of valve member 37" when the relief screw valve 53 is turned, member 37" is provided with a threaded shank 56 which extends through a central opening in diaphragm 26' and is firmly clamped against it by a nut member 57 (which takes the place of member 33 of Fig. 1) and against the upper end of which nut member the lower end of handwheel shank 31' bears for closing valve 37' as the handwheel 32' is turned.

In either of the constructions the turning of the handwheel forces the needle valve toward closed position, and flexes the diaphragm slightly out of its natural plane, while upon reverse turning permits the gas pressure to lift the valve, though aided by the recovery force of the diaphragm.

As screw 43 is for choking purposes its original setting is never altered, as the separate relief screw valve 50 or 53 provides for reduction of the bonnet pressure, and needle valve 37 or 37' provides for admission of additional pressure as well as final sealing of the pressure against further change.

A feature of importance to note is that in both the showings in the drawing, the needle valve 37, 37' is directed against the source of gas pressure so that the pressure always tends to open the needle valve, and the handwheel 32 or 32' is used for closing the valve against the pressure. Also that in both constructions the upward or outward flexing of the valve diaphragm 26 or 26' is very slight and is positively limited by a shoulder 58 formed within the cap recess and against which shoulder member 33 of Fig. 1 or 57 of Fig. 2 stop when the valve is open, and that further unscrewing of the handwheel 32 or 32', or its entire removal will not cause breaking of the valve diaphragm from excess pressure.

Another feature of importance is that there are no extraneous or exposed gas pipes or tubes in the improved construction, as all gas passages are formed within the metal of the regulator body, bonnet, and upper cap.

Having thus described my invention, what I claim is:

1. In an automatic gas pressure regulator having a diaphragm controlled valve and a bonnet on the regulator covering said diaphragm and forming with the outer side of the diaphragm a closed chamber forming a controlling gas pressure space, a cap removably secured to the outer end of said bonnet and provided with a central passageway, a hand screw threaded in said passageway, confronting recesses in the adjacent surfaces of said bonnet and said cap respectively of a diameter larger than said passageway, the recess in the bonnet provided with a smaller diameter recess extending from its bottom further into said bonnet and formed at its lower end with a needle valve seat, and a small gas passage extending within the body of the bonnet from an exterior point to the inner end of said needle valve seat, a gas passage extending from the bonnet recess direct to said gas pressure space, a flexible diaphragm separating said confronting recesses clamped between the bonnet and said cap, a needle valve having a shank slidably positioned in the smaller extension of the bonnet recess controlling said seat and provided with an enlarged head in contact with said diaphragm slidably positioned in the large portion of the recess and substantially the diameter thereof, and a block slidably positioned in the recess of the cap and substantially the diameter thereof and in contact at one side with the opposite side of said diaphragm and at the other side exposed to pressure of said hand screw, the depth of said recesses being such as to positively limit the movement of said diaphragm to slight flexing in opening and closing said needle valve, and said head and block substantially entirely covering the exposed area of the diaphragm at both sides and slightly arched on their surfaces to give the diaphragm substantially continuous support when flexed.

2. In a structure as set out in claim 1, a small bore extending axially through said hand screw, block, diaphragm and into the needle valve shank and there formed with a closing seat, a vent extending from said closing seat through the side of the shank, and a relatively small needle valve within said bore to control said closing seat and provided with a stem threaded in the bore and extending to the upper end thereof for exterior accessibility.

LUDWIG W. STETTNER.